US010823497B2

(12) United States Patent
Ros

(10) Patent No.: US 10,823,497 B2
(45) Date of Patent: Nov. 3, 2020

(54) INSULATION-TIME DETERMINING DEVICE FOR A THERMALLY INSULATED CONTAINER

(71) Applicant: REP IP AG, Oberwil bei Zug (CH)

(72) Inventor: Nico Ros, Basel (CH)

(73) Assignee: REP IP AG, Oberwil bei Zug (CH)

( * ) Notice: Subject to any disclaimer, the term of this patent is extended or adjusted under 35 U.S.C. 154(b) by 306 days.

(21) Appl. No.: 15/027,881

(22) PCT Filed: Oct. 7, 2014

(86) PCT No.: PCT/CH2014/000145
§ 371 (c)(1),
(2) Date: Apr. 7, 2016

(87) PCT Pub. No.: WO2015/051474
PCT Pub. Date: Apr. 16, 2015

(65) Prior Publication Data
US 2016/0252296 A1 Sep. 1, 2016

(30) Foreign Application Priority Data
Oct. 10, 2013 (CH) ..................... 1734/13

(51) Int. Cl.
*F25D 29/00* (2006.01)
*F28D 20/02* (2006.01)
*F25D 3/04* (2006.01)
*B65D 81/38* (2006.01)
*F25D 3/06* (2006.01)
(Continued)

(52) U.S. Cl.
CPC ....... *F25D 29/003* (2013.01); *B65D 81/3813* (2013.01); *F25D 3/04* (2013.01);
(Continued)

(58) Field of Classification Search
USPC .................................. 702/136
See application file for complete search history.

(56) References Cited

U.S. PATENT DOCUMENTS 6,771,183 B2 * 8/2004 Hunter ............... B65D 81/3823
220/592.25
8,696,151 B1 * 4/2014 Barakat .................. G01K 7/42
236/51
(Continued)

FOREIGN PATENT DOCUMENTS

AT 382636 B 3/1987
DE 10058938 A1 5/2002
(Continued)

OTHER PUBLICATIONS

Machine translation of JP 08296937 A.*
Machine translation of EP 2482021 A2.*
Machine translation of DE 10235581 C1.*

*Primary Examiner* — Gregory J Toatley, Jr.
*Assistant Examiner* — Terence E Stifter, Jr.
(74) *Attorney, Agent, or Firm* — The Webb Law Firm

(57) ABSTRACT

An insulation-time determining device for a thermally insulated container with a latent heat accumulator includes energy-calculating equipment for calculating the amount of thermal energy stored in the latent heat accumulator from at least one status parameter of the thermally insulated container or the interior thereof as well as display equipment for displaying the calculated amount of stored thermal energy or a value correlated therewith. The insulation-time determining device also includes insulation-time calculating equipment to calculate a maximum insulation time provided with a safety correction factor of the thermally insulated container from the calculated amount of stored thermal energy or a value correlated therewith and a specified external temperature progression outside the thermally insulated container, during which maximum insulation time a specified temperature range is neither fallen below nor exceeded in the interior of the thermally insulated container.

20 Claims, 2 Drawing Sheets

(51) Int. Cl.
 *G01N 25/00* (2006.01)
 *F28D 20/00* (2006.01)
(52) U.S. Cl.
 CPC ............ *F25D 3/06* (2013.01); *F25D 29/005* (2013.01); *F28D 20/02* (2013.01); *F28D 20/028* (2013.01); *G01N 25/00* (2013.01); *F25D 2400/36* (2013.01); *F25D 2700/12* (2013.01); *F25D 2700/14* (2013.01); *F28D 2020/0026* (2013.01); *F28F 2270/00* (2013.01); *Y02E 60/145* (2013.01)

(56) References Cited

U.S. PATENT DOCUMENTS

| | | | | |
|---|---|---|---|---|
| 2009/0220220 | A1* | 9/2009 | Bilodeau | F24D 11/00 |
| | | | | 392/341 |
| 2011/0290792 | A1* | 12/2011 | Krzak | B65D 81/3816 |
| | | | | 220/1.5 |
| 2013/0245991 | A1* | 9/2013 | Kriss | G06Q 50/28 |
| | | | | 702/150 |
| 2014/0117026 | A1 | 5/2014 | Ros et al. | |
| 2015/0153087 | A1* | 6/2015 | Yamashita | F25D 3/00 |
| | | | | 62/457.2 |

FOREIGN PATENT DOCUMENTS

| | | | | |
|---|---|---|---|---|
| DE | 10235581 | C1 * | 8/2003 | ......... B60H 1/00492 |
| DE | 102007037856 | A1 | 2/2009 | |
| DE | 202012103715 | U1 | 12/2012 | |
| DE | 202012103716 | U1 | 1/2013 | |
| EP | 2482021 | A2 * | 8/2012 | ........... F28D 20/021 |
| JP | 08296937 | A * | 11/1996 | |
| WO | 9906781 | A1 | 2/1999 | |
| WO | 2012142639 | A1 | 10/2012 | |

\* cited by examiner

INSULATION-TIME DETERMINING DEVICE FOR A THERMALLY INSULATED CONTAINER

CROSS-REFERENCE TO RELATED APPLICATIONS

This application is the United States national phase of International Application No. PCT/CH2014/000145 filed Oct. 7, 2014, and claims priority to Switzerland Patent Application No. 1734/13 filed Oct. 10, 2013, the disclosures of which are hereby incorporated in their entirety by reference.

BACKGROUND OF THE INVENTION

Field of the Invention

The present invention relates to an insulation-time determining device for a thermally insulated container with a latent heat accumulator and to a method for determining a maximum insulation time provided with a safety correction factor of a thermally insulated container with a latent heat accumulator.

Description of Related Art

In particular for the transport of temperature-sensitive products, such as pharmaceuticals, thermally insulated containers are used nowadays, which are transported in planes, vehicles and/or ships in a closed state after storage of the products, wherein the thermally insulated containers are restored again and again. To maintain the interior of the thermally insulated container in a specified temperature range, there are active and passive systems.

Active systems are on the one hand systems that use mechanical cooling aggregates to control the temperature and on the other hand systems that use Peltier elements to directly generate temperature differences by electrical means, thus being able to maintain the interior of the thermally insulated container in a certain temperature range. One drawback of active systems is that they need electrical current for their operation.

In a known passive system, such as it is described for example in WO 2012/142639 A1, the physical effect of the phase transition of a material is used to keep the temperature within a certain range. During a phase transition between the "liquid" and "solid" states of aggregation of a so-called phase change material (PCM) that takes place within a certain temperature range, the phase change material absorbs significantly more energy during the phase transition from solid to liquid, or releases significantly more energy during the phase transition from liquid to solid, than in a similarly large temperature range outside the phase transition. In phase change materials, the latent heat of fusion, heat of solution or heat of absorption is generally significantly larger than the heat that they can store due to their normal specific heat capacity (without the phase transition effect).

WO 2012/142639 A1 discloses a thermally insulated container with a latent heat accumulator comprising a suitable phase change material, which has been arranged in cavities of the container wall that surrounds the interior chamber. The latent heat accumulator absorbs, when heated, the supplied energy through the solid-state-to-liquid-state transition process and releases, when cooling down, the detracted energy through the liquid-state-to-solid-state transition process.

A latent heat accumulator is generally a device capable of storing up thermal energy in a concealed way, with few losses, over many repetition cycles and for long periods of time. Latent heat accumulators exploit the enthalpy of thermodynamic changes of the state of aggregation of a storage media. The principle most often exploited is the phase transition between solid-state-to-liquid-state and vice versa.

When transporting temperature-sensitive products in a thermally insulated container, it is crucial to know for how long, depending on the outside temperatures, the temperature of the products in the thermally insulated container can be maintained within the permissible range. Such knowledge makes it possible to optimally plan the transport with regard to the route, the duration, the means of transport and possible temporary storage, i.e. various outside temperature scenarios.

Until now, maximum insulation times of thermally insulated containers with latent heat accumulators have been determined through validation tests. Such validation tests measure for how long the permissible temperature range can be maintained under a certain outside temperature profile. For this purpose, temperature profiles of the International Safe Transit Association (ista) may be used for example. Quite often, too, the temperatures at actual transports of products on a route are measured, to take into account the outside influences of the transport.

However, both methods, the validation with standard outside temperature profiles and the measurements of actual transports, suffer from the drawback that they can only establish how the system reacts with respect to only one or a few number of outside temperature scenarios. The response of the system to different scenarios can only be interpolated or extrapolated based on the existing test results. Since every actual transport, however, has its own specific temperature profile, such tests are not ideal instruments for the preparation of such a transport for the mentioned reasons. They are furthermore only capable of delivering a "passed failed" result, not allowing finer distinctions with respect to how good the test has been solved, and therefore, failing to identify any "safety margins" for a transport, much less revealing how such margins might be increased.

SUMMARY OF THE INVENTION

Therefore, an object of the present invention is to provide a reliable and universally applicable system for determining a maximum insulation time provided with a safety correction factor of a thermally insulated container with a latent heat accumulator.

An insulation-time determining device for a thermally insulated container with a latent heat accumulator of the invention comprises:

an energy-calculating equipment for calculating the amount of thermal energy stored in the latent heat accumulator from at least one status parameter of the thermally insulated container or the interior thereof, a display equipment for displaying the calculated amount of stored thermal energy or a value correlated therewith, an input unit for entering an external temperature progression, and an insulation-time calculating equipment, by means of which a maximum insulation time provided with a safety correction factor of the thermally insulated container can be calculated from the calculated amount of stored thermal energy or a value correlated therewith and a the entered external temperature progression outside the thermally insulated container, during which maximum insulation time a specified temperature range is neither fallen below nor exceeded in the interior of the thermally insulated container.

For how long the temperature in the interior of the thermally insulated container can be maintained within the permissible range under a certain outside temperature profile also depends on the amount of thermal energy stored in the latent heat accumulator. The determination of the amount of thermal energy stored in the latent heat accumulator from on at least one status parameter of the thermally insulated container or the interior thereof is, therefore, essential for the determination of the maximum insulation time. According to the invention, this task is performed by the energy-calculating equipment for calculating the amount of thermal energy stored in the latent heat accumulator from at least one status parameter of the thermally insulated container or the interior thereof. Subsequently, with a display equipment for displaying the calculated amount of stored thermal energy or a value correlated therewith this energy or a value correlated therewith can be displayed.

One value that correlates with the calculated amount of stored thermal energy is, for example, the temperature of the phase change material of the latent heat accumulator. The phase transition of the phase change material does not occur fully and all at once at a temperature $T_{Phase}$, but within a temperature range [$T_{solid}$, $T_{liquid}$], wherein the state of aggregation of the phase change material is solid below the temperature $T_{solid}$ and liquid over the temperature $T_{liquid}$ and the storage of energy during the phase transition depends on the temperature. By means of the temperature, it can be determined what proportion of the phase transition is completed and how much thermal energy is stored, and vice versa. The amount of stored thermal energy and the temperature of the phase change material are therefore biuniquely correlated.

Another value that correlates with the calculated amount of stored thermal energy is, for example, the maximum insulation time, provided the external temperature progression is known. Under a given external temperature progression, the display equipment therefore preferably displays the maximum insulation time or a maximum insulation time provided with a safety correction factor, either in addition to the amount of stored thermal energy or without this value. For this purpose, the external temperature progression must have been previously defined in the insulation-time determining device, for example by entering this progression via a input unit.

The provision of the maximum insulation time with a safety correction factor enables the maintenance of the specified temperature range under practical circumstances, when the individual parameters and variables cannot be precisely determined. It also makes it possible to compensate for and offset inhomogeneities of the thermally insulated container, of the temperature distribution around the thermally insulated container and in the interior of the thermally insulated container.

The insulation-time calculating equipment and the energy-calculating equipment can be physically realized in the same device, for example a processor of a computer.

In a preferred embodiment, the at least one status parameter, from which the amount of thermal energy stored in the latent heat accumulator is calculated, is at least one temperature in the interior of the thermally insulated container.

As explained above, there is a biunique correlation between the amount of stored thermal energy and the temperature of the phase change material. The temperature in the interior of the thermally insulated container is roughly equivalent to the temperature of the phase change material, wherein the temperature normally is not everywhere equal in the interior, but there is a temperature distribution. In order to calculate the amount of thermal energy stored in the latent heat accumulator, it is therefore preferable either to use several temperatures from various sections of the interior of the thermally insulated container or to use the temperature which is the worst for the calculation of the maximum insulation time, to be on the safe side.

For the purpose of determining the at least one temperature in the interior of the thermally insulated container, the insulation-time determining device advantageously comprises at least one temperature sensor. This allows the determination of at least one real temperature in the interior of the thermally insulated container.

Alternatively, it is also possible to enter one or several fictitious temperatures for the interior of the thermally insulated container into the insulation-time determining device, for example via an input unit. In this way, the amount of stored thermal energy and possibly also the maximum insulation time provided with a safety correction factor of a thermally insulated container can be theoretically calculated. This makes it possible to optimally plan the transport of the thermally insulated container with regard to the route, the duration, the means of transport and possible temporary storage, i.e. various outside temperature scenarios. Thereby, the insulation-time determining device according to the invention can be used as a transport planning instrument.

In an alternative embodiment, the insulation-time determining device according to the invention comprises an equipment for determining the electric resistance of the phase change material as a status parameter of the thermally insulated container. In a solid state, the phase change material has a different electric resistance than in a liquid state. This is why the electric resistance can serve to determine how much of the phase change material is in what state of aggregation, i.e. how large the amount of stored thermal energy is.

In another alternative embodiment, the insulation-time determining device according to the invention comprises an equipment for determining the optical density of the phase change material as a status parameter of the thermally insulated container. The optical density of the phase change material changes during the phase transition, such that it can be determined based thereupon how much of the phase change material is in what state of aggregation, i.e. how large the amount of stored thermal energy is.

The insulation-time calculating equipment can be realized as a dedicated insulation-time calculating equipment or, for example, via a computer that may also be used for other purposes and that has been either provided with a suitable software or that can access suitable software via the Internet, wherein this computer may be connected to or communicate with auxiliary devices such as for example temperature sensors.

In a preferable embodiment of the insulation-time determining device according to the invention, the display equipment is arranged at the thermally insulated container. In this way, some sort of a charge status display for the latent heat accumulator of the thermally insulated container can be realized.

Other elements of the insulation-time determining device can be arranged at the thermally insulated container, which allow the calculation and the display of the maximum insulation times provided with a safety correction factor of the thermally insulated container for different scenarios directly at the thermally insulated container.

Generally speaking, the use of the insulation-time determining device according to the invention as a transport-planning instrument is one important possible application.

According to the method of the invention for determining a maximum insulation time provided with a safety correction factor of a thermally insulated container with a latent heat accumulator, the amount of thermal energy stored in the latent heat accumulator is calculated from at least one status parameter of the thermally insulated container or the interior thereof. Following that, the maximum insulation time provided with a safety correction factor of the thermally insulated container is calculated from this calculated amount of stored thermal energy and a specified external temperature progression outside the thermally insulated container, during which maximum insulation time a specified temperature range is neither fallen below nor exceeded in the interior of the thermally insulated container.

As already explained above in connection with the insulation-time determining device, the method according to the invention enables the maintenance of the specified temperature range under practical circumstances and the optimal planning of the transport of the thermally insulated container with regard to the route, the duration, the means of transport and possible temporary storage, i.e. various outside temperature scenarios.

In preferred embodiments of the method according to the invention, the at least one status parameter is at least one temperature in the interior of the thermally insulated container or the electric resistance or the optical density of a phase change material of the latent heat accumulator. Preferably, several temperatures from different sections of the interior of the thermally insulated container are used as status parameters, or the temperature is used which is the worst for the calculation of the maximum insulation time, to be on the safe side.

Preferably, the calculation of the maximum insulation time provided with a safety correction factor of the thermally insulated container from the amount of stored thermal energy and from a specified external temperature progression outside the thermally insulated container is calibrated through prior comparative measurements with the thermally insulated container. This calibration allows the calculation to be adapted to the actual thermally insulated container, ensuring a more precise calculation with a smaller safety margin.

Preferably, for the calculation of the maximum insulation time provided with a safety correction factor of the thermally insulated container, the smallest number n is calculated, starting from which it applies that $$E_{t_0} + \sum_{i=1}^{n} \Delta E_i(\Delta T_i \cdot \gamma_+(\Delta T_i), \Delta t_i \cdot \gamma(\Delta t_i), \Omega \cdot \gamma(\Omega)) > E_{max} \cdot \gamma(E_{max})$$

and with $t_{max+} = \sum_{i=1}^{n} \Delta t_i$ a maximum insulation time provided with a safety correction factor of the thermally insulated container $t_{max+}$ is calculated, during which a selectable maximum permissible temperature $T_{max}$ is not exceeded in the interior of the thermally insulated container, wherein:

$E_{t_0}$: amount of stored thermal energy at a starting point-in-time $t_0$;

$E_{max}$: maximum permissible amount of stored thermal energy, which corresponds to a selectable maximum permissible temperature $T_{max}$;

$\Delta t_i = t_i - t_{i-1}$;

$t_i$: point-in-time i following starting point-in-time $t_0$;

$\Delta T_i = T_{ex_i} - T_{in_i}$: temperature difference between external temperature $T_{ex_i}$ and internal temperature $T_{in_i}$ of the thermally insulated container in time interval $\Delta t_i$, wherein one external temperature $T_{ex_i}$ and one internal temperature $T_{in_i}$ each are selected for different external temperatures $T_{ex_i}$ around the thermally insulated container and/or different internal temperatures $T_{in_i}$ inside the thermally insulated container in time interval $\Delta t_i$;

$\Omega$: energy flow from the interior of the thermally insulated container to the outside or vice versa per Kelvin and second;

$\Delta E_i(\Delta T_i \cdot \gamma_+(\Delta T_i), \Delta t_i \cdot \gamma(\Delta t_i), \Omega \cdot \gamma(\Omega))$: difference of the amount of stored thermal energy at the points-in-time $t_i$ and $t_{i-1}$ depending on temperature difference $\Delta T_i$ and the energy flow per Kelvin and second $\Omega$;

$\gamma_+(\Delta T_i) \geq 1$: for positive $\Delta T_i$ and $\gamma_+(\Delta T_i) \leq 1$ for negative $\Delta T_i$: safety correction factor for $\Delta T_i$;

$\gamma(\Delta t_i) \geq 1$: safety correction factor for $\Delta t_i$;

$\gamma(\Omega) \geq 1$: safety correction factor for $\Omega$;

$\gamma(E_{max}) \leq 1$: safety correction factor for $E_{max}$.

Preferably, for the calculation of the maximum insulation time provided with a safety correction factor of the thermally insulated container, the smallest number m is calculated, starting from which $$E_{t_0} + \sum_{i=1}^{m} \Delta E_i(\Delta T_i \cdot \gamma_-(\Delta T_i), \Delta t_i \cdot \gamma(\Delta t_i), \Omega \cdot \gamma(\Omega)) < E_{min} \cdot \gamma(E_{min})$$

and with $t_{max-} = \sum_{i=1}^{m} \Delta t_i$ a maximum insulation time provided with a safety correction factor of the thermally insulated container $t_{max-}$ is calculated, during which a selectable minimum permissible temperature $T_{min}$ is not fallen below in the interior of the thermally insulated container, wherein:

$E_{t_0}$: amount of stored thermal energy at a starting point-in-time $t_0$;

$E_{min}$: minimum permissible amount of stored thermal energy, which corresponds to a selectable minimum permissible temperature $T_{min}$;

$\Delta t_i = t_i - t_{i-1}$;

$t_i$: point-in-time i following starting point-in-time $t_0$;

$\Delta T_i = T_{ex_i} - T_{in_i}$: temperature difference between external temperature $T_{ex_i}$ and internal temperature $T_{in_i}$ of the thermally insulated container in time interval $\Delta t_i$, wherein one external temperature $T_{ex_i}$ and one internal temperature $T_{in_i}$ each are selected for different external temperatures $T_{ex_i}$ around the thermally insulated container and/or different internal temperatures $T_{in_i}$ inside the thermally insulated container in time interval $\Delta t_i$;

$\Omega$: energy flow from the interior of the thermally insulated container to the outside or vice versa per Kelvin and second;

$\Delta E_i(\Delta T_i \cdot \gamma_-(\Delta T_i), \Delta t_i \cdot \gamma(\Delta t_i), \Omega \cdot \gamma(\Omega))$: difference of the amount of stored thermal energy at the points-in-time $t_i$ and $t_{i-1}$ depending on temperature difference $\Delta T_i$ and the energy flow per Kelvin and second $\Omega$;

$\gamma_-(\Delta T_i) \geq 1$ for negative $\Delta T_i$ and $\gamma_-(\Delta T_i) \leq 1$ for positive $\Delta T_i$: safety correction factor for $\Delta T_i$;

$\gamma(\Delta t_i) \geq 1$: safety correction factor for $\Delta t_i$;

$\gamma(\Omega) \geq 1$: safety correction factor for $\Omega$;

$\gamma(E_{min}) \geq 1$: safety correction factor for $E_{min}$.

Especially in cases where both positive and negative temperature differences $\Delta T_i$ between external temperatures $T_{ex_j}$ and internal temperatures $T_{in_j}$ occur, both the maximum insulation time provided with a safety correction factor of the thermally insulated container $t_{max+}$, during which a selectable maximum permissible temperature $T_{max}$ is not exceeded in the interior of the thermally insulated container, and the maximum insulation time provided with a safety correction factor of the thermally insulated containers $t_{max-}$, during which a selectable minimum permissible temperature $T_{min}$ is not fallen below in the interior of the thermally insulated container, should be calculated. The maximum insulation time provided with a safety correction factor of the thermally insulated container $t_{max}$, during which a specified temperature range is neither fallen below nor exceeded in the interior of the thermally insulated container, is then the shorter of the two insulation times $t_{max+}$ und $t_{max-}$.

As mentioned above, $\Delta T_i = T_{ex_j} - T_{in_j}$ represents the temperature difference between external temperature $T_{ex_j}$ and internal temperature $T_{in_j}$ of the thermally insulated container during time interval $\Delta t_i$, wherein one external temperature $T_{ex_j}$ and one internal temperature $T_{in_j}$ each are selected for the calculation in case of different external temperatures $T_{ex_j}$ around the thermally insulated container and/or different internal temperatures $T_{in_j}$ inside the thermally insulated container during time interval $\Delta t_i$. Preferably, for calculating the amount of thermal energy stored in the latent heat accumulator, the external temperature $T_{ex_j}$ and the internal temperature $T_{in_j}$ are selected which are the worst for the calculation of the maximum insulation time, to be on the safe side. Alternatively, mean values are used.

The difference $\Delta E_i(\Delta T_i \cdot \gamma_+(\Delta T_i), \Delta t_i \cdot \gamma(\Delta t_i), \Omega \cdot \gamma(\Omega))$ or $\Delta E_i(\Delta T_i \cdot \gamma_-(\Delta T_i), \Delta t_i \cdot \gamma(\Delta t_i), \Omega \cdot \gamma(\Omega))$ of the amount of stored thermal energy at the points-in-time $t_i$ and $t_{i-1}$ is a function of the temperature difference $\Delta T_i$, the time interval $\Delta t_i$ and the energy flow from the interior of the thermally insulated container to the outside or vice versa per Kelvin and second $\Omega$. The latter depends on the thermally insulated container, specifically on the design of its wall, its size and the insulation material, and is preferably determined by calibration measurements.

The difference $\Delta E_i(\Delta T_i \cdot \gamma_+(\Delta T_i), \Delta t_i \cdot \gamma(\Delta t_i), \Omega \cdot \gamma(\Omega))$ or $\Delta E_i(\Delta T_i \cdot \gamma_-(\Delta T_i), \Delta t_i \cdot \gamma(\Delta t_i), \Omega \gamma(\Omega))$ is positive when the external temperature $T_{ex_j}$ is higher than the internal temperature $T_{in_j}$ and negative when the external temperature $T_{ex_j}$ is lower than the internal temperature $T_{in_j}$. This means that energy is either supplied or extracted from the latent heat accumulator, depending on the ratio between those two temperatures.

The values $\Delta T_i$, $\Delta t_i$ and $\Omega$ that are relevant for the function are all provided with a safety correction factor $\gamma_+(\Delta T_i)$ or $\gamma_-(\Delta T_i)$, $\gamma(\Delta t_i)$ or $\gamma(\Omega)$ in order to compensate for imprecisions in the determination of these values, inhomogeneities, risks such as the ageing of the insulation material etc. in such a way that the specified temperature range certainly is neither fallen below nor exceeded.

The safety correction factors $\gamma_+(\Delta T_i)$ and $\gamma_-(\Delta T_i)$ differ to ensure that the safety correction for the calculation of the maximum insulation time provided with a safety correction factor of a thermally insulated container $t_{max+}$ or $t_{max-}$ proceeds in the right direction for every time interval.

The safety correction factors $\gamma_+(\Delta T_i)$ and $\gamma_-(\Delta T_i)$ can be different for different temperature differences $\Delta T_i$, for example to provide a higher safety margin for extreme external temperatures. The safety correction factors $\gamma(\Delta t_i)$ for different time intervals $\Delta t_i$ may also be different, for example to provide a higher safety margin for longer terms.

In addition to the safety correction factors $\gamma_+(\Delta T_i)$ or $\gamma_-(\Delta T_i)$, $\gamma(\Delta t_i)$ or $\gamma(\Omega)$, which are employed in the differences $\Delta E_i(\Delta T_i \cdot \gamma_+(\Delta T_i), \Delta t_i \cdot \gamma(\Delta t_i), \Omega \gamma(\Omega))$ or $\Delta E_i(\Delta T_i \cdot \gamma_-(\Delta T_i), \Delta t_i \cdot \gamma(\Delta t_i), \Omega \cdot \gamma(\Omega))$, the maximum permissible amount of stored thermal energy $E_{max}$ is multiplied with the safety correction factor $\gamma(E_{max})$, and the minimum permissible amount of stored thermal energy $E_{min}$ is multiplied with the safety correction factor $\gamma(E_{min})$, wherein these safety correction factors cause a global safety margin depending on the amounts of energy $E_{max}$ and $E_{min}$, respectively.

It is not necessary to select only safety correction factors that are different from 1. Particularly, if the global safety correction factor $\gamma(E_{max})$ is sufficiently low and the global safety correction factor $\gamma(E_{min})$ is sufficiently high, it is possible to select a value of 1 for the remaining safety correction factors, simplifying the calculation. On the other side it is also possible—provided the safety correction factors $\gamma_+(\Delta T_i)$, $\gamma_-(\Delta T_i)$, $\gamma(\Delta t_i)$ and $\gamma(\Omega)$ have been suitably set—to select a value of 1 for the global safety correction factors $\gamma(E_{max})$ and $\gamma(E_{min})$, allowing in general a more precise calculation of the maximum insulation time provided with a safety correction factor of the thermally insulated container $t_{max+}$, $t_{max-}$ or $t_{max}$.

Preferably, it shall apply that $\Delta E_i(\Delta T_i \cdot \gamma_+(\Delta T_i), \Delta t_i \cdot \gamma(\Delta t_i), \Omega \cdot \gamma(\Omega)) = \Delta T_i \cdot \gamma_+(\Delta T_i) \cdot \Delta t_i \cdot \gamma(\Delta t_i) \cdot \Omega \cdot \gamma(\Omega)$ and/or $\Delta E_i(\Delta T_i \cdot \gamma_-(\Delta T_i), \Delta t_i \cdot \gamma(\Delta t_i), \Omega \cdot \gamma(\Omega)) = \Delta T_i \cdot \gamma_-(\Delta T_i) \cdot \Delta t_i \cdot \gamma(\Delta t_i) \cdot \Omega \cdot \gamma(\Omega)$.

This allows an easy calculation of $\Delta E_i$.

The safety correction factors and the energy flow from the interior of the thermally insulated container to the outside or vice versa per Kelvin and second $\Omega$ are preferably determined by prior calibration measurements with the thermally insulated container. The calibration measurements are preferably conducted for different temperature scenarios. This way, it is possible to determine optimal safety correction factors and energy flow values per Kelvin and second $\Omega$ for every individual thermally insulated container.

It also applies that the precision of the calculations can be increased through shortening the time intervals $\Delta t_i$.

BRIEF DESCRIPTION OF THE DRAWINGS

In the following, the insulation-time determining device according to the invention and the method for determining a maximum insulation time provided with a safety correction factor of a thermally insulated container with a latent heat accumulator according to the invention are described based on an exemplary embodiment illustrated in the drawings. It is shown.

DESCRIPTION OF THE INVENTION

Figure 1:
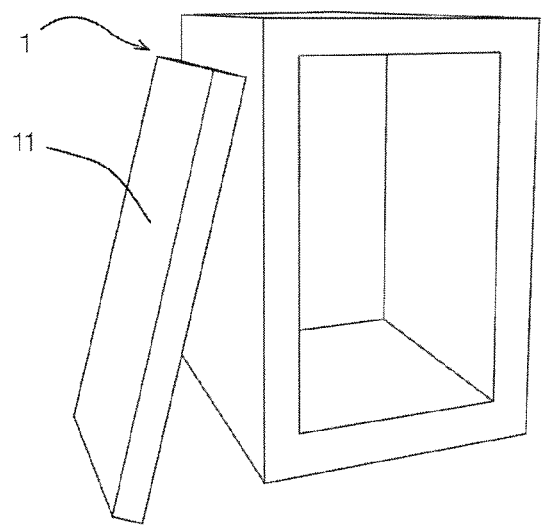
FIG. 1—a perspective view of a thermally insulated container with the front wall removed.

FIG. 1 shows a thermally insulated container 1 with walls that are made up of insulation elements, wherein the front wall 11 has been detached from the rest of the thermally insulated container 1 so the latter can be charged. The insulation elements contain phase change material, which serves as a latent heat accumulator. Devices similar to the thermally insulated container 1 are in principle known.

Figure 2:
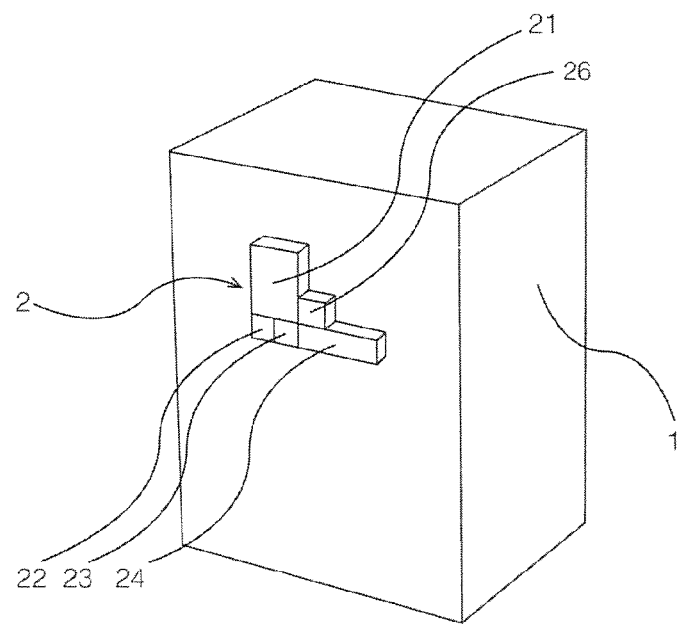
FIG. 2—the thermally insulated container of FIG. 1 in the closed state with a schematic representation of a dedicated insulation-time calculating equipment.

FIG. 2 shows the thermally insulated container 1 of FIG. 1 in the closed state. To this thermally insulated container 1, an exemplary embodiment of the insulation-time determining device 2 according to the invention for determining a maximum insulation time provided with a safety correction factor of the thermally insulated container 1 is attached. The insulation-time determining device 2 comprises a display equipment 21, an energy-calculating equipment 22, an insulation-time calculating equipment 23, an input unit 24 and an external temperature sensor 26, all of which are only schematically depicted here. The energy-calculating equipment 22 and the insulation-time calculating equipment 23 can also be realized together in a calculation unit such as, for example, a computer processor.

Figure 3:
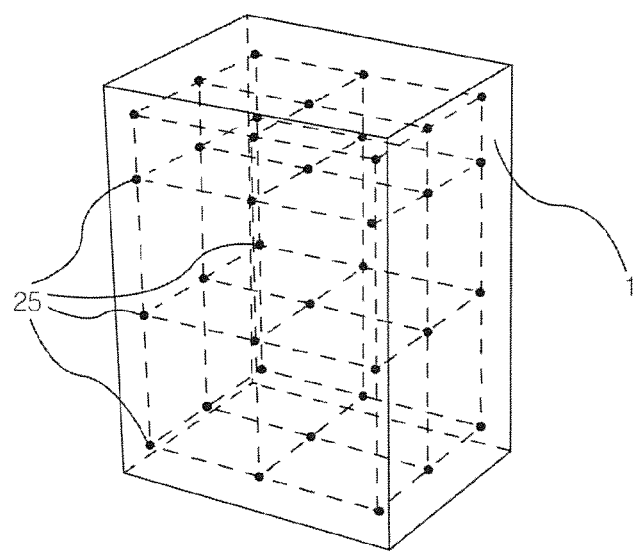
FIG. 3—the thermally insulated container of FIG. 2 with indicated temperature sensors.

FIG. 3 shows the thermally insulated container 1 of FIG. 2 with a large number of schematically represented temperature sensors 25 that are distributed over the interior of the thermally insulated container 1. The temperature sensors 25 deliver temperature values from the interior of the thermally insulated container 1 for the calculation of the amount of thermal energy stored in the latent heat accumulator, and they are for this purpose connected with the energy-calculating equipment 22, either through not represented cables or through wireless communication.

Normally, the temperature sensors 25 in the upper section of the thermally insulated container 1 deliver the highest measured values while the temperature sensors 25 in the lower section of the thermally insulated container 1 deliver the lowest measured values. In order to ensure that the required temperature range is observed inside the entire interior of the thermally insulated container 1, the energy calculation is always based on the most unfavourable temperature value, i.e. on a measurement value from a temperature sensor 25 in the upper section of the thermally insulated container 1 when it is critical not to exceed the maximum permissible temperature and on a measurement value from a temperature sensor 25 in the lower section of the thermally insulated container 1 when it is critical not to fall short of the minimum permissible temperature. Alternatively, it is also possible to use a mean value, but then the safety correction factors $\gamma_+(\Delta T_i)$ or $\gamma_-(\Delta T_i)$ for $\Delta T_i$ must be selected by reflecting correspondingly more unfavourable conditions.

Having calibrated the insulation-time determining device 2 for a specific thermally insulated container 1, this device can be used as a charge level indicator for the latent heat accumulator of the thermally insulated container 1 and, for example, display the following information:
- one or several interior temperatures,
- the external temperature,
- the amount of thermal energy stored in the latent heat accumulator or a current still available energy absorption capacity and/or energy release capacity of the latent heat accumulator that is correlated therewith,
- the time for several external temperatures until the maximum energy absorption capacity and/or energy release capacity is reached, corresponding to the maximum insulation time for each of the external temperatures in question, and/or
- other correlated information.

The insulation-time determining device can also be used as a transport planning instrument by entering various temperature scenarios, which correspond to various transport scenarios, via the input unit 24, in an attempt to find an optimal transport scenario that takes into account maximum insulation time and safety margins.

For the use as a transport planning instrument, the temperature sensors 25 and 26 are not required when the system is calibrated. This is why it is possible for this purpose to replace the insulation-time determining device 2 with an insulation-time determining device that is neither attached nor otherwise linked to the thermally insulated container 1, for example a common computer, which may also serve other purposes, that is equipped with a suitable software or that, for example, can access a suitable software via the Internet.

Figure 4:
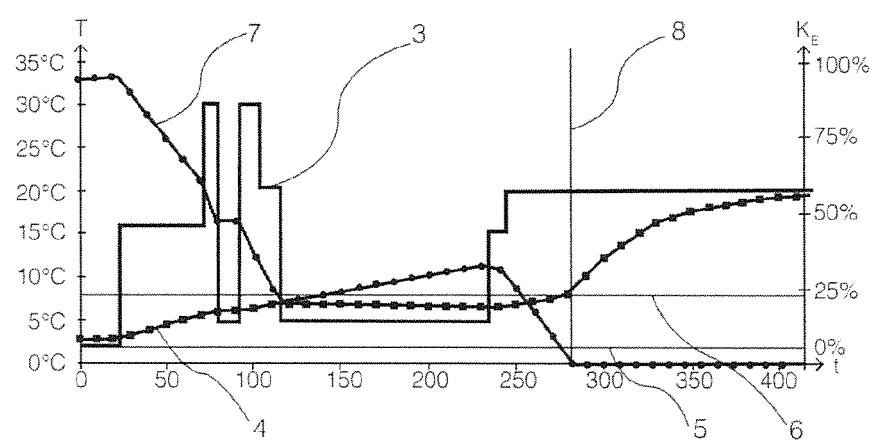
FIG. 4—a temperature progression diagram.

FIG. 4 shows a temperature progression diagram for an exemplary external temperature scenario that could, for example, be represented on the display equipment 21 or a computer screen. The time axis is horizontal, while the axes for the temperature and the energy capacity are vertical.

Reference number 3 marks the external temperature progression, 4 the development of the mean temperature value in the interior of the thermally insulated container 1, 5 the specified minimum permissible temperature $T_{min}$ (here: 2° C.), 6 the specified maximum permissible temperature $T_{max}$ (here: 8° C.) and 7 the development of the energy absorption capacity $K_E$ of the latent heat accumulator.

The energy absorption capacity $K_E$ is partly determined by the size of the latent heat accumulator and partly by the amount of thermal energy that has been stored. The larger the amount of thermal energy that has already been stored, i.e. the further the phase transition of the phase change material from solid to liquid has advanced, the smaller the remaining energy absorption capacity $K_E$. FIG. 4 shows the energy absorption capacity $K_E$ in %, wherein 0% has been defined in such a way that at an energy absorption capacity $K_E$ of 0% the amount of thermal energy stored in the latent heat accumulator corresponds to the maximum permissible temperature $T_{max}$, and 100% has been defined in such a way that at an energy absorption capacity $K_E$ of 100% the amount of thermal energy stored in the latent heat accumulator corresponds to a pre-conditioning temperature of the thermally insulated container 1 of 3° C. This energy absorption capacity scale is relative, and it is in principle possible to obtain values that exceed 100% or fall below 0%. It is also possible to select other energy absorption capacity scales.

The internal temperature curve 4 is the result of a large number of measurements, conducted in intervals of 10 seconds each. The energy absorption capacity $K_E$ correlates with the internal temperature T via the amount of stored thermal energy, such that each internal temperature value T corresponds with a value for the energy absorption capacity $K_E$, resulting in the energy absorption capacity curve 7.

In the represented example, the thermally insulated container 1 starts with an internal temperature T of 4° C. at the starting point-in-time $t_0=0$ hours and is first subjected to an external temperature of 2° C., which lowers the internal temperature and increases the energy absorption capacity $K_E$. Following this, the external temperature rises to 16° C., which increases the internal temperature and lowers the energy absorption capacity $K_E$. On the basis of the external temperature progression 3, the internal temperature curve 4 and the energy absorption capacity curve 7 result.

The vertical line 8 shows that the internal temperature exceeds the maximum permissible temperature $T_{max}$ of 8° C. after a time period of approx. 273 hours, which means that the maximum insulation time for this scenario is approx. 273 hours. At this point-in-time, the energy absorption capacity $K_E$ also falls to 0%, wherein the representation of FIG. 4 has corrected any lower values to 0%.

Further variations of the insulation-time determining devices and methods described herein may be realized. It is to be noted specifically that the amount of thermal energy stored in the latent heat accumulator also correlates with values that have not been mentioned and that can also be calculated and displayed.

The invention claimed is:

1. An insulation-time determining system, comprising:
   a thermally insulated container with a latent heat accumulator;
   a sensor to measure at least one status parameter of the thermally insulated container or an interior thereof,
   energy-calculating equipment configured to calculate an amount of thermal energy stored in the latent heat accumulator from at least one status parameter of the thermally insulated container or an interior thereof,
   display equipment configured to display the calculated amount of stored thermal energy or a value correlated therewith,
   an input unit configured to enter an external temperature progression, wherein the external temperature progression is defined in the insulation-time determining device by specifying a known temperature progression via the input unit; and
   insulation-time calculating equipment, configured to calculate a maximum insulation time provided with a safety correction factor of the thermally insulated container from the calculated amount of stored thermal energy or a value correlated therewith and the specified external temperature progression outside the thermally insulated container, during which maximum insulation time a specified temperature range is neither fallen below nor exceeded in the interior of the thermally insulated container,
   wherein the amount of thermal energy stored in the latent heat accumulator is calculated by the energy-calculating equipment to ensure the maximum insulation time the specified temperature range is neither fallen below nor exceeded in the interior of the thermally insulated container based on determining a status in an upper section of the thermally insulated container or a status in a lower section of the thermally insulated container.

2. The insulation-time determining device according to claim 1, wherein the at least one status parameter is at least one temperature in the interior of the thermally insulated container.

3. The insulation-time determining device according to claim 2, wherein the latent heat accumulator comprises a phase change material and the insulation-time determining device comprises equipment configured to determine the electric resistance of the phase change material as a status parameter of the thermally insulated container.

4. The insulation-time determining device according to claim 2, further comprising at least one temperature sensor configured to measure at least one temperature in the interior of the thermally insulated container.

5. The insulation-time determining device according to claim 4, wherein the latent heat accumulator comprises a phase change material and the insulation-time determining device comprises equipment configured to determine the electric resistance of the phase change material as a status parameter of the thermally insulated container.

6. The insulation-time determining device according to claim 1, wherein the latent heat accumulator comprises a phase change material and the insulation-time determining device comprises equipment configured to determine the electric resistance of the phase change material as a status parameter of the thermally insulated container.

7. The insulation-time determining device according to claim 1, wherein the latent heat accumulator comprises a phase change material and the insulation-time determining device comprises equipment configured to determine the optical density of the phase change material as a status parameter of the thermally insulated container.

8. The insulation-time determining device according to claim 1, wherein the display equipment is arranged at the thermally insulated container.

9. A method for determining a maximum insulation time provided with a safety correction factor of a thermally insulated container with a latent heat accumulator, comprising:
   providing a sensor to measure at least one status parameter of the thermally insulated container or an interior thereof,
   calculating an amount of thermal energy stored in the latent heat accumulator from at least one status parameter of the thermally insulated container or an interior thereof,
   receiving a specified external temperature progression outside the thermally insulated container, wherein the external temperature progression is defined in an insulation-time determining device by specifying a known temperature progression via an input unit; and
   calculating a maximum insulation time provided with a safety correction factor of the thermally insulated container from the calculated amount of stored thermal energy and the specified external temperature progression outside the thermally insulated container, during which maximum insulation time a specified temperature range is neither fallen below nor exceeded in the interior of the thermally insulated container,
   wherein the amount of thermal energy stored in the latent heat accumulator is calculated to ensure the maximum insulation time the specified temperature range is neither fallen below nor exceeded in the interior of the thermally insulated container based on determining a status in an upper section of the thermally insulated container or a status in a lower section of the thermally insulated container.

10. The method according to claim 9, wherein the at least one status parameter is at least one temperature in the interior of the thermally insulated container or the electric resistance or the optical density of a phase change material of the latent heat accumulator.

11. The method according to claim 10, wherein the calculation of the maximum insulation time provided with a safety correction factor of the thermally insulated container from the amount of stored thermal energy and from the specified external temperature progression outside the thermally insulated container is calibrated through prior comparative measurements with the thermally insulated container.

12. The method according to claim 9, wherein the calculation of the maximum insulation time provided with a safety correction factor of the thermally insulated container from the amount of stored thermal energy and from the specified external temperature progression outside the thermally insulated container is calibrated through prior comparative measurements with the thermally insulated container.

13. The method according to claim 9, wherein the calculated amount of stored thermal energy or a value correlated therewith and/or the maximum insulation time provided with a safety correction factor is displayed with display equipment.

14. A method for determining a maximum insulation time provided with a safety correction factor of a thermally insulated container with a latent heat accumulator, comprising:
- providing a sensor to measure at least one status parameter of the thermally insulated container or an interior thereof,
- calculating an amount of thermal energy stored in the latent heat accumulator from at least one status parameter of the thermally insulated container or an interior thereof,
- receiving a specified external temperature progression outside the thermally insulated container; and
- calculating a maximum insulation time provided with a safety correction factor of the thermally insulated container from the calculated amount of stored thermal energy and the specified external temperature progression outside the thermally insulated container, during which maximum insulation time a specified temperature range is neither fallen below nor exceeded in the interior of the thermally insulated container, wherein
- for the calculation of the maximum insulation time provided with a safety correction factor of the thermally insulated container, a smallest number n is calculated, starting from which it applies that $$E_{t_0} + \Sigma_{i=1}^{n} \Delta E_i(\Delta T_i \cdot \gamma_+(\Delta T_i), \Delta t_i \cdot \gamma(\Delta t_i), \Omega \cdot \gamma(\Omega)) > E_{max} \cdot \gamma(E_{max}),$$

and with $t_{max+} = \Sigma_{i=1}^{n} \Delta t_i$ a maximum insulation time provided with a safety correction factor of the thermally insulated container $t_{max+}$ is calculated, during which a selectable maximum permissible temperature $T_{max}$ is not exceeded in the interior of the thermally insulated container, wherein:
- $E_{t_0}$ is an amount of stored thermal energy at a starting point-in-time $t_0$;
- $E_{max}$ is a maximum permissible amount of stored thermal energy, which corresponds to a selectable maximum permissible temperature $T_{max}$;

$$\Delta t_i = t_i - t_{i-1};$$

- $t_i$ is a point-in-time i following starting point-in-time $t_0$;
- $\Delta T_i = T_{ex_i} - T_{in_i}$ is a temperature difference between external temperature $T_{ex_i}$ and internal temperature $T_{in_i}$ of the thermally insulated container in time interval $\Delta t_i$, wherein one external temperature $T_{ex_i}$ and one internal temperature $T_{in_i}$ each are selected for different external temperatures $T_{ex_i}$ around the thermally insulated container and/or different internal temperatures $T_{in_i}$ inside the thermally insulated container in time interval $\Delta t_i$;
- $\Omega$ is an energy flow from the interior of the thermally insulated container to the outside or vice versa per Kelvin and second;
- $\Delta E_i(\Delta T_i \cdot \gamma_+(\Delta T_i), \Delta t_i \cdot \gamma(\Delta t_i), \Omega \cdot \gamma(\Omega))$ is a difference of the amount of stored thermal energy at the points-in-time $t_i$ and $t_{i-1}$ depending on temperature difference $\Delta T_i$ and the energy flow per Kelvin and second $\Omega$;
- $\gamma_+(\Delta T_i) \geq 1$ for positive $\Delta T_i$ and $\gamma_+(\Delta T_i) \leq 1$ for negative $\Delta T_i$ is a safety correction factor for $\Delta T_i$;
- $\gamma(\Delta t_i) \geq 1$ is a safety correction factor for $\Delta t_i$;
- $\gamma(\Omega) \geq 1$ is a safety correction factor for $\Omega$;
- $\gamma(E_{max}) \leq 1$ is a safety correction factor for $E_{max}$,
- wherein the amount of thermal energy stored in the latent heat accumulator is calculated to ensure the maximum insulation time the specified temperature range is neither fallen below nor exceeded in the interior of the thermally insulated container based on determining a status in an upper section of the thermally insulated container or a status in a lower section of the thermally insulated container.

15. The method according to claim 14, wherein $\Delta E_i(\Delta T_i \cdot \gamma_+(\Delta T_i), \Delta t_i \cdot \gamma(\Delta t_i), \Omega \cdot \gamma(\Omega)) = \Delta T_i \cdot \gamma_+(\Delta T_i) \cdot \Delta t_i \cdot \gamma(\Delta t_i) \cdot \Omega \cdot \gamma(\Omega)$.

16. The method according to claim 15, wherein the safety correction factors and the energy flow from the interior of the thermally insulated container to the outside or vice versa per Kelvin and second $\Omega$ are determined by prior calibration measurements with the thermally insulated container.

17. The method according to claim 14, wherein the safety correction factors and the energy flow from the interior of the thermally insulated container to the outside or vice versa per Kelvin and second 1 are determined by prior calibration measurements with the thermally insulated container.

18. A method for determining a maximum insulation time provided with a safety correction factor of a thermally insulated container with a latent heat accumulator, comprising:
- providing a sensor to measure at least one status parameter of the thermally insulated container or an interior thereof,
- calculating an amount of thermal energy stored in the latent heat accumulator from at least one status parameter of the thermally insulated container or an interior thereof,
- receiving a specified external temperature progression outside the thermally insulated container; and
- calculating a maximum insulation time provided with a safety correction factor of the thermally insulated container from the calculated amount of stored thermal energy and the specified external temperature progression outside the thermally insulated container, during which maximum insulation time a specified temperature range is neither fallen below nor exceeded in the interior of the thermally insulated container, wherein
- for the calculation of the maximum insulation time provided with a safety correction factor of the thermally insulated container, a smallest number m is calculated, starting from which it applies that $$E_{t_0} + \Sigma_{i=1}^{m} \Delta E_i(\Delta T_i \cdot \gamma_-(\Delta T_i), \Delta t_i \cdot \gamma(\Delta t_i), \Omega \cdot \gamma(\Omega)) < E_{min} \cdot \gamma(E_{min}),$$

and with $t_{max-} = \Sigma_{i=1}^{m} \Delta t_i$ a maximum insulation time provided with a safety correction factor of the thermally insulated container tmax– is calculated, during which a selectable minimum permissible temperature $T_{min}$ is not fallen below in the interior of the thermally insulated container, wherein:
- $E_{t_0}$ is an amount of stored thermal energy at a starting point-in-time to;
- $E_{min}$ is a minimum permissible amount of stored thermal energy, which corresponds to a selectable minimum permissible temperature $T_{min}$;

$$\Delta t_i = t_i - t_{i-1};$$

- $t_i$ is a point-in-time i following starting point-in-time $t_0$;
- $\Delta T_i = T_{ex_i} - T_{in_i}$ is a temperature difference between external temperature $T_{ex_i}$ and internal temperature $T_{in_i}$ of the thermally insulated container in time interval $\Delta t_i$, wherein one external temperature $T_{ex_i}$ and one internal temperature $T_{in_i}$ each are selected for different external temperatures $T_{ex_i}$ around the thermally insulated container and/or different internal temperatures $T_{in_i}$ inside the thermally insulated container in time interval $\Delta t_i$;

Ω is an energy flow from the interior of the thermally insulated container to the outside or vice versa per Kelvin and second;

$\Delta E_i(\Delta T_i \cdot \gamma_-(\Delta T_i), \Delta t_i \cdot \gamma(\Delta t_i), \Omega \cdot \gamma(\Omega))$ is a difference of the amount of stored thermal energy at the points-in-time $t_i$ and $t_{i-1}$ depending on temperature difference $\Delta T_i$ and the energy flow per Kelvin and second $\Omega$;

$\gamma_-(\Delta T_i) \geq 1$ for negative $\Delta T_i$ and $\gamma_-(\Delta T_i) \leq 1$ for positive $\Delta T_i$ is a safety correction factor for $\Delta T_i$;

$\gamma(\Delta t_i) \geq 1$ is a safety correction factor for $\Delta t_i$;

$\gamma(\Omega) \geq 1$ is a safety correction factor for $\Omega$;

$\gamma(E_{min}) \geq 1$ is a safety correction factor for $E_{min}$, wherein the amount of thermal energy stored in the latent heat accumulator is calculated to ensure the maximum insulation time the specified temperature range is neither fallen below nor exceeded in the interior of the thermally insulated container based on determining a status in an upper section of the thermally insulated container or a status in a lower section of the thermally insulated container.

19. The method according to claim 18, wherein $\Delta E_i(\Delta T_i \cdot \gamma_-(\Delta T_i), \Delta t_i \cdot \gamma(\Delta t_i), \Omega \cdot \gamma(\Omega)) = \Delta T_i \cdot \gamma_-(\Delta T_i) \cdot \Delta t_i \cdot \gamma(\Delta t_i) \cdot \Omega \cdot \gamma(\Omega)$.

20. The method according to claim 18, wherein the safety correction factors and the energy flow from the interior of the thermally insulated container to the outside or vice versa per Kelvin and second 1 are determined by prior calibration measurements with the thermally insulated container.

* * * * *

UNITED STATES PATENT AND TRADEMARK OFFICE
CERTIFICATE OF CORRECTION

| | | |
|---|---|---|
| PATENT NO. | : 10,823,497 B2 | Page 1 of 1 |
| APPLICATION NO. | : 15/027881 | |
| DATED | : November 3, 2020 | |
| INVENTOR(S) | : Nico Ros | |

It is certified that error appears in the above-identified patent and that said Letters Patent is hereby corrected as shown below:

In the Claims

Column 13, Lines 26-27, Claim 14, delete
"$E_{t0}+\Sigma_{i=1}^{n}\Delta E_i(\Delta T_i \cdot \gamma Y_+(\Delta T_i), \Delta t_i \cdot \gamma(\Delta t_i), \Omega \cdot \gamma(\Omega) > E_{max} \cdot \gamma(E_{max}),$" and insert
-- $E_{t0}+\Sigma_{i=1}^{n}\Delta E_i(\Delta T_i \cdot \gamma_+(\Delta T_i), \Delta t_i \cdot \gamma(\Delta t_i), \Omega \cdot \gamma(\Omega)) > E_{max} \cdot \gamma(E_{max}),$ --

Column 13, Line 55, Claim 14, delete "$\Delta E_i(\Delta T_i \cdot \gamma_+(\Delta T_i), \Delta t_i \cdot \gamma(\Delta t_i), \Omega \cdot \gamma(\Omega)$" and
insert -- $\Delta E_i(\Delta T_i \cdot \gamma_+(\Delta T_i), \Delta t_i \cdot \gamma(\Delta t_i), \Omega \cdot \gamma(\Omega))$ --

Column 14, Line 16, Claim 17, delete "1" and insert -- $\Omega$ --

Column 15, Line 28, Claim 20, delete "1" and insert -- $\Omega$ --

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*